United States Patent
Li et al.

(10) Patent No.: US 8,428,629 B2
(45) Date of Patent: Apr. 23, 2013

(54) METHODS AND APPARATUS FOR DETERMINING A COMMUNICATIONS MODE AND/OR USING A DETERMINED COMMUNICATIONS MODE

(75) Inventors: Junyi Li, Chester, NJ (US); Vincent D. Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 495 days.

(21) Appl. No.: 12/750,834

(22) Filed: Mar. 31, 2010

(65) Prior Publication Data
US 2011/0244899 A1 Oct. 6, 2011

(51) Int. Cl.
  *H04B 7/00* (2006.01)
  *H04B 1/00* (2006.01)
  *H04B 15/00* (2006.01)

(52) U.S. Cl.
  USPC .......................... 455/500; 455/524; 455/63.1

(58) Field of Classification Search .................. 455/423, 455/437, 500, 524, 63.1, 67.11, 67.13, 550.1, 455/114.2
  See application file for complete search history.

(56) References Cited

U.S. PATENT DOCUMENTS

| | | | |
|---|---|---|---|
| 7,860,521 B2 * | 12/2010 | Chen et al. | 455/501 |
| 2003/0206577 A1 * | 11/2003 | Liberti et al. | 375/152 |
| 2007/0104164 A1 * | 5/2007 | Laroia et al. | 370/338 |
| 2007/0133491 A1 | 6/2007 | Ushiki et al. | |
| 2009/0016295 A1 * | 1/2009 | Li et al. | 370/330 |
| 2009/0017762 A1 * | 1/2009 | Jovicic et al. | 455/63.1 |
| 2010/0167719 A1 * | 7/2010 | Sun et al. | 455/423 |
| 2011/0014920 A1 * | 1/2011 | Nylander et al. | 455/442 |
| 2011/0223867 A1 * | 9/2011 | Chae et al. | 455/63.1 |
| 2012/0184206 A1 * | 7/2012 | Kim et al. | 455/9 |
| 2012/0208578 A1 * | 8/2012 | Jeong et al. | 455/501 |

FOREIGN PATENT DOCUMENTS

| | | |
|---|---|---|
| EP | 2012480 A1 | 1/2009 |
| WO | 2004032536 | 4/2004 |
| WO | 2010006650 A1 | 1/2010 |

OTHER PUBLICATIONS

International Search Report and Written Opinion—PCT/US2011/030491—ISA/EPO—Nov. 10, 2011.

* cited by examiner

*Primary Examiner* — Andrew Wendell
(74) *Attorney, Agent, or Firm* — Paul S. Holdaway

(57) ABSTRACT

Methods and apparatus for determining a mode of wireless communications to be used by a wireless terminal, e.g., a direct communications mode or an infrastructure communications mode are described. In some embodiments, the mode to be used is determined by a control node based on interference which will be caused to the system taking into consideration at least an area, e.g., cell, in which the wireless terminal seeking to communicate is not located. System interference cost estimates for each mode under consideration are generated and compared. Interference cost estimates may, and do, correspond to different frequency bands when the direct mode uses a different frequency band than the infrastructure communications mode. Separate interference cost estimates and mode determinations are made for different communications directions in some embodiments. The determined mode to be used is communicated to the devices seeking to communicate, e.g., via one or more base stations.

20 Claims, 10 Drawing Sheets

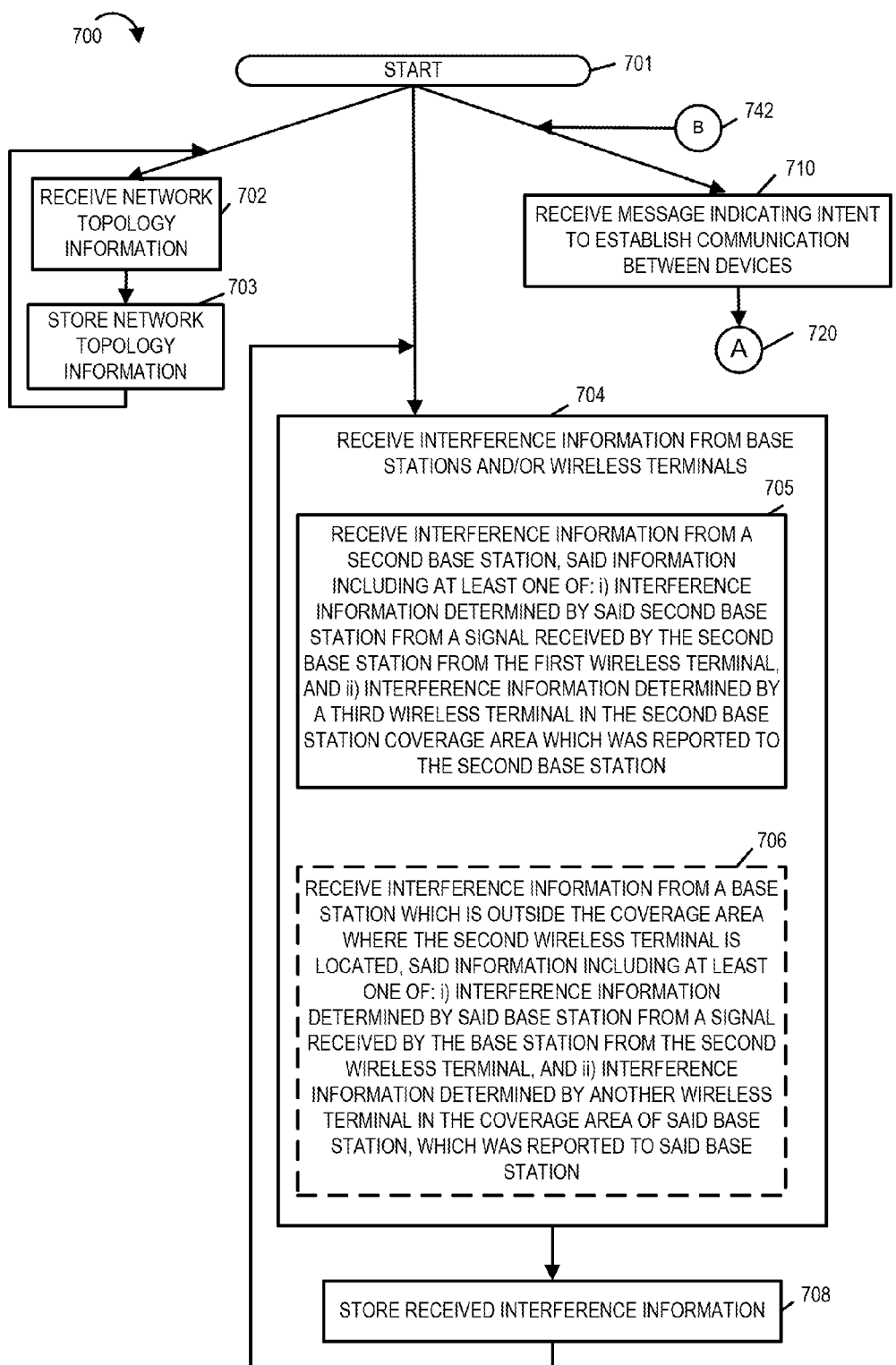

| FIGURE 9A | FIGURE 9B |

METHODS AND APPARATUS FOR DETERMINING A COMMUNICATIONS MODE AND/OR USING A DETERMINED COMMUNICATIONS MODE

FIELD

Various embodiments relate to wireless communications methods and apparatus and, more particularly, to wireless communications methods for determining a communications mode to use, e.g., a direct or an infrastructure communications mode, and/or using a determined communications mode to communicate.

BACKGROUND

With the advancement of technology, communications systems are becoming more and more diverse. For example, communications devices which support various different communications technologies and protocols can now operate in a communications system, e.g., network, and may communicate with each other, e.g., using a direct mode of communication such as peer to peer communication or using an infrastructure mode of communication, e.g., with communication between the devices being achieved with signals being communicated via another device such as a base station.

Generally in peer-to-peer communications, peer devices discover each other and subsequently establish peer-to-peer communications through direct signaling between the devices, without any intervention from a centralized controller. This is sometimes referred to as an infrastructure-less approach. Some devices may support both peer-to-peer communications and infrastructure based communications, e.g., communications via a base station.

Thus, in a single communications network, some communications devices may use peer to peer signaling to directly communicate with one another, while others may communicate in an infrastructure mode of operation, e.g., communicating via a base station.

Individual wireless terminals may decide what mode of operation to operate in, at a given time, e.g., a peer to peer mode or an infrastructure mode of operation, e.g., based on the mode the wireless terminal believes will create an acceptable level of interference to other devices. Unfortunately, an individual wireless terminal may have a limited understanding of its surroundings. Thus a wireless terminal may not fully appreciate the interference effects it may have on one or more devices, which the wireless terminal may or may not be aware of, when making a decision with regard to the mode of operation that should be used at a particular point in time. As a result of the limited information available to wireless terminals, individual devices and/or pairs of devices seeking to communicate may not be able to determine which communications mode of operation, e.g., direct mode or infrastructure mode, is the most suitable mode for communicating and/or which mode of communications is likely to have the biggest impact on overall throughput of devices operating in a geographic area. Thus, it should be appreciated that decisions made by an individual wireless terminal or a pair of wireless terminals may be suboptimal from an overall system perspective. The problem of a wireless terminals limited knowledge of the overall system and potential interference effects can be particularly significant where the wireless terminal is in a region where the wireless terminal's transmission may interfere with communications in multiple cells of which the wireless terminal may have little or limited knowledge in some cases.

From the above, it should be appreciated that individual wireless terminals often lack the ability to see the larger picture in terms of total interference implications from their mode decision. Thus, if wireless terminals are left to make determinations regarding the mode of operation the decision may be suboptimal in overall system performance.

While providing wireless terminals greater information about a network and potential interference implications of their mode selection decisions, factors which affect interference such as the location of mobiles within cells, cell loading, etc. can change frequently making it difficult to distribute such information to large number of devices in a timely manner. Furthermore, communicating significant amounts of interference related information to wireless terminals to facilitate mode decision determinations can consume valuable resources.

In view of the above discussion it should be appreciated that it would be beneficial if methods and/or apparatus could be developed which would facilitate determination of a suitable mode of operation for communications devices such that the mode determination process takes into consideration the effect of a mode of operation on various devices and/or cells without having to provide large amounts of network interference information to wireless terminals on a frequent basis.

SUMMARY

Methods and apparatus for determining the mode of wireless communications to be used by a wireless terminal and/or using a determined communications mode are described. In at least some exemplary embodiments a communications device, e.g., wireless terminal, can communicate with another communications device, using either a direct mode of communication, e.g., using peer to peer signaling, or an infrastructure mode of communication, e.g., a mode in which communication occurs via an infrastructure element such as a base station. In some embodiments, the mode to be used is determined by a control node, e.g., a communications control sever, discovery server, or another device, based on interference which will be caused by the communication in an area, e.g., cell, in which the wireless terminal seeking to communicate is not located. Thus, in accordance with at least one feature, a control device takes into consideration the interference which will be caused to a base station coverage area, e.g., cell, in which at least one of the devices seeking to communicate is not located. The interference which may be caused within a cell in which the device seeking to communicate may also be considered by the control device in making the mode determination. By taking into consideration the effect of the interference caused to multiple cells, the control device can make a decision which takes into consideration the effect of the communication on devices and network elements located outside the cell in which an individual device seeking to communicate is located. Thus, the mode may be selected to minimize overall system interference and may be based on information which may not be readily available to the wireless terminal seeking to communicate and which may not even be available to a base station in a cell in which a wireless terminal is located.

Interference cost estimates may, and do, correspond to different frequency bands when the direct communications mode uses a different frequency band than the infrastructure communications mode. Thus, at least in some embodiments, a direct communications mode interference cost estimate corresponding to a first frequency band is compared to an infrastructure communications cost estimate corresponding to a second frequency band which is different from the first frequency band. The selected communications mode may, and in some embodiments is, the mode with the lower interference cost estimate.

By having the mode determination controlled by a control device, e.g., centralized controller, the mode determination may, and often does, take into consideration system wide interference costs, e.g., interference costs relating to multiple cells, without the need to distribute the information used to make the decision to wireless terminals and/or multiple base stations. Thus, the centralized mode determination approach used in various embodiments can result in a more efficient use of resources by managing interference taking into consideration system wide interference as opposed to simply interference within a single cell.

While the communications channel between two devices may be relatively symmetric, the interference cost to other devices in a system may depend in large part on which device in a pair of communicating devices is transmitting and the transmitting devices proximity to other devices. Thus, the interference cost to a system may be different in for each direction of communication. In various embodiments, the communications mode is determined separately for each direction of communication. Thus, in some embodiments the mode selected for communicating from device A to device B may be different from the mode selected for communicating from device B to device A. For example, in one such embodiment, a first device may be instructed to use peer to peer communication for communication to a second device and to use infrastructure mode for communications from the second device to the first device.

While the mode of communication is determined on a per direction basis in some embodiments, in other embodiments a single mode determination is made and the single mode is used for communication in both directions.

The mode of communication selected by the control node may be communicated to both devices which are seeking to communicate via base station transmissions. In other embodiments, the mode is communicated to one of the devices in a pair of communications devices seeking to communicate, and the informed device communicates the determined mode to the other device, e.g., via a peer to peer signal when the selected mode is a peer to peer mode or via a base station when the selected mode is an infrastructure mode.

Among the described methods and apparatus are methods and apparatus for operating a control device, e.g., network node, to determine a first mode of operation for communication from a first wireless terminal, located in a first base station coverage area, to a second wireless terminal as a function of interference which will be caused in a second base station coverage area adjacent said first base station coverage area, said first mode of operation being one of a direct mode of operation and an infrastructure mode of operation, and to communicate to the first wireless terminal the determined first mode of operation to be used for communication from the first wireless terminal to the second wireless terminal. In some embodiments, the second wireless terminal is located in the second base station coverage area. The determination of the mode of operation to use may be a function of interference which will be caused by said communication to multiple cells.

One exemplary communications device comprises: at least one processor configured to: determine a first mode of operation for communication from a first wireless terminal, located in a first base station coverage area, to a second wireless terminal as a function of interference which will be caused in a second base station coverage area adjacent said first base station coverage area, said first mode of operation being one of a direct mode of operation and an infrastructure mode of operation, and communicate to the first wireless terminal the determined first mode of operation to be used for communication from the first wireless terminal to the second wireless terminal. The communications device may, and in some embodiments does, include a memory coupled to the at least one processor.

In addition to exemplary methods and apparatus, various aspects are directed to a computer program product for use in a communications device, comprising a computer readable medium comprising code for causing at least one computer to determine a first mode of operation for communication from a first wireless terminal, located in a first base station coverage area, to a second wireless terminal as a function of interference which will be caused in a second base station coverage area adjacent said first base station coverage area, said first mode of operation being one of a direct mode of operation and an infrastructure mode of operation, and code for causing the at least one computer to communicate to the first wireless terminal the determined first mode of operation to be used for communication from the first wireless terminal to the second wireless terminal.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 7A, which is a first part of FIG. 7, is a flowchart illustrating an exemplary method of operating a control device, in accordance with one exemplary embodiment.

FIG. 7, illustrates a second part of the exemplary method of operating a control device in accordance with one exemplary embodiment.

DETAILED DESCRIPTION

Figure 1:
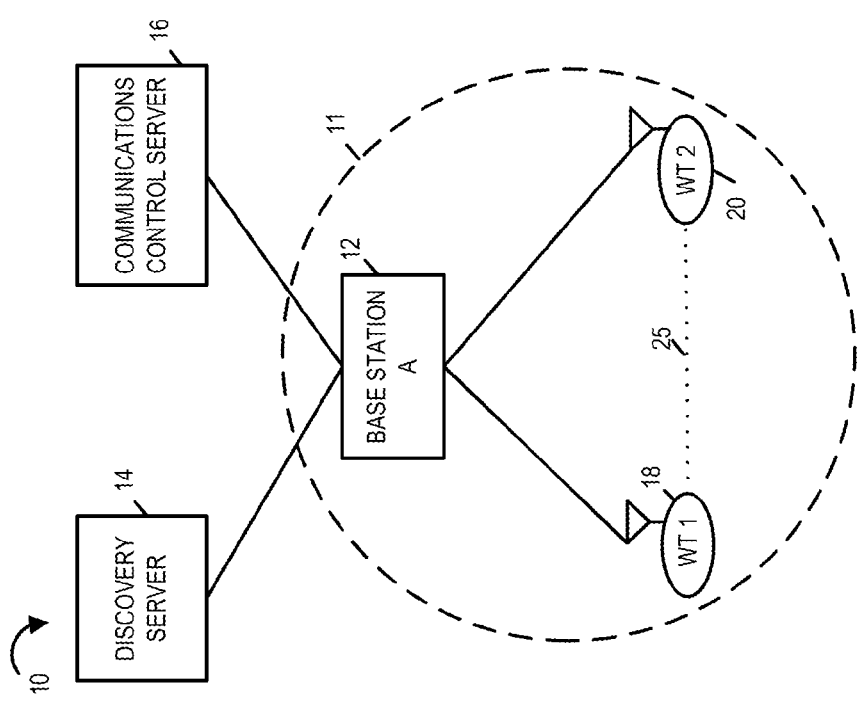
FIG. 1 illustrates an exemplary wireless communications system, and communications between various devices in the system in accordance with one embodiment.

FIG. 1 illustrates a communications system 10 including a base station A 12, a discovery server 14, a communications control server 16 and a plurality of communications devices including wireless terminals WT 1 18 and WT 2 20. In the FIG. 1 example, both wireless terminals 18, 20 are located in the base station coverage area 11 corresponding to base station A 12. The base station coverage area 11 is sometimes referred to as the cell in which base station A 12 is located. Thus, for purposes of discussion a base station coverage area will be referred to as a cell. While not shown in FIG. 1 the system 10 may, and normally does, include multiple base stations as is the case shown in FIG. 2.

In the FIG. 1 embodiment communications devices, e.g., wireless terminals 18, 20 each communicate with the exemplary discovery server 10, e.g., via a base station such as base station A 12, to provide its location as well as the expressions, e.g., discovery information, that the device 18, 20 would like to advertise and/or to monitor. This information may be updated by the individual devices 18, 20 upon changes, e.g., as the devices 18, 20 change location and/or the users of the devices indicate a change in preferences, devices or information which is to be discovered. When the expressions of two devices 18, 20 within some proximity of each other match, the discovery server 14 may, and normally does, alert one or both devices 18, 20 to enable the devices and/or users thereof to decide whether to establish a communication path to further exchange traffic.

Location information as well as information about which device pairs are seeking a communication path between them, is provided to, e.g., a control device, e.g., communications control server 16 which may be implemented as a node in the communications system 10. The communication control server 16 may determine, e.g., based on system interference considerations, whether a communication path between two devices, e.g., wireless terminals 18 and 20, should occur via an infrastructure element such as base station 12 or via a direct peer-to-peer link. The decision may be made on a per direction basis. In the FIG. 1 example, the communications control server control 16 determines whether two or more devices, will communicate using a direct communications mode of operation or an infrastructure mode of communication operation. While the communications control sever 16 and discovery server 14 are shown in FIG. 1 as individual nodes, the functions of the two servers may be implemented in a single node which provides both discovery and control functionality to the system 10.

In the example of FIG. 1, the wireless terminal WT 1 18 can communicate with wireless terminal WT 2 20 through intermediate base station 12. However, direct peer-to-peer communications is an alternative possibility as illustrated by the dashed link 25. Communications control sever 16 has knowledge of the topology of the system 10, e.g., location of neighboring cells, and receives interference information, cell loading information, and/or other information useful in generating interference cost estimates and predicting the interference which will be caused in the system due to communications between devices. Communications control server 16 determines, based on one or more factors, e.g., system interference cost estimates, whether the two devices 18, 20 are to operate in a direct mode of operation or a peer to peer mode of operation at a given point in time. The determination may be made by the control server 16 generating an interference cost estimate for each possible communications mode of operation and selecting the communications mode having the lowest interference cost estimate from a system perspective. Thus, the communications control server 16, in some embodiments, receives information from multiple cells and takes into consideration the interference effect to not just one cell but multiple cells when making the mode determination. The mode of operation to be used, which is determined by the communications control sever 16, is communicated to the wireless terminals, e.g., via one or more messages sent by base station A. The determination of which mode of operation is to be used may be based, at least in part, on the interference the communication between wireless terminals 1 and 2 (18, 20) will have on a neighboring base station.

In the case where both terminals 18, 20 are in the same cell, the wireless terminals 18, 20 and base station 12 within the cell 11, may have a reasonable understanding of the interference the communication between the two devices 18, 20 may cause at least in the cell 11 in which the two devices 18, 20 are located. However, the base station 12 and wireless terminals 18, 20 normally do not include the full set of detailed information available to communications control server 16 reported by multiple cells and/or the full set of network topology information stored in communications control server 16. Thus, the individual wireless terminals and base station 12 may lack the detailed information available to the communications control server 16 for making the interference cost determinations. In some but not necessarily all embodiments, the communications control server 16 keeps track of which devices are communicating using a particular mode of operation, there location, and the frequency band being used for the communications. In this manner, the communications control sever 16 may, and in some embodiments does, take into consideration that peer to peer communications may, and in some cases are, affected differently than infrastructure communications and factor that into the interference cost estimate (s) used for selecting the mode of communication to be used by a particular pair of devices seeking to communicate.

Figure 2:
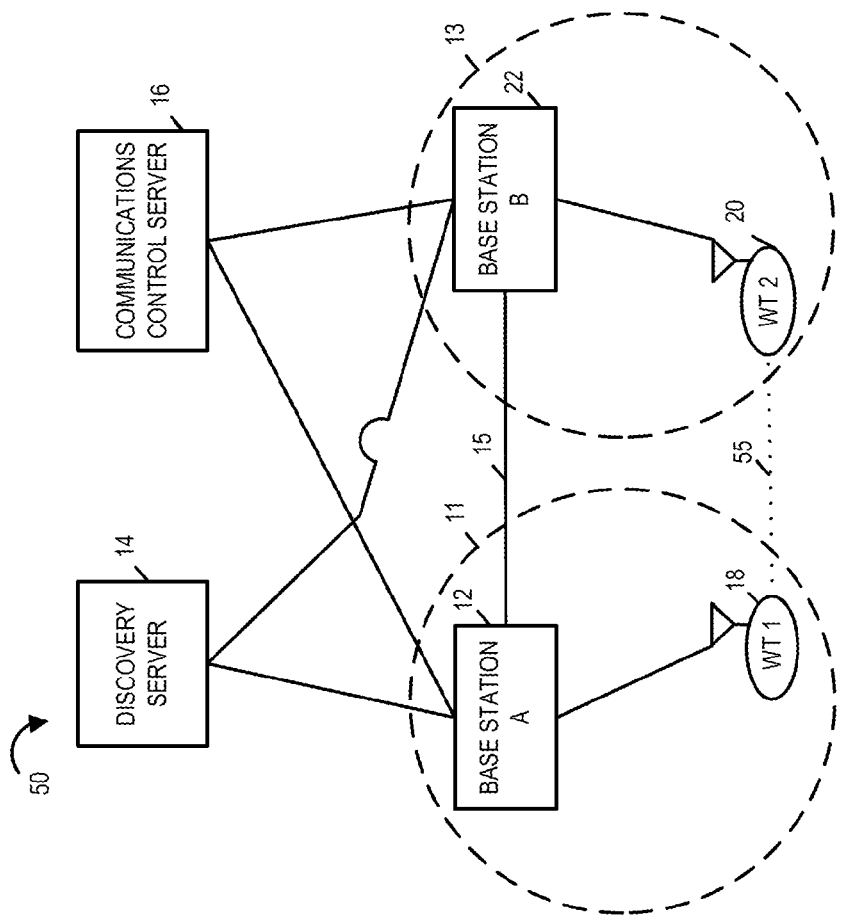
FIG. 2 illustrates another exemplary communications system implemented in accordance with another exemplary embodiment.

FIG. 2 shows a more detailed illustration 50 of the system shown in FIG. 1 with an additional base station, e.g., base station B 22 shown in addition to base station A 12. In the FIG. 2 example WT 1 18 is shown in cell 11 while WT 2 20 is shown in cell 13 corresponding to base station B 22. It should be appreciated that FIG. 2 may correspond to a different point in time than the FIG. 1 example, e.g., a point in time following a move by WT 2 from the first cell 11 to the second cell 13. In the FIG. 2 example WT 1 18 and WT 2 20 have connections to different base stations, e.g., base station A 12 and base station B 22, respectively. Base stations 12, 22 are connected together via a backhaul link 15. Both base stations 12, 22 are also coupled to the discovery server 14 and communications control server 16 as shown.

As in the FIG. 1 example, the communications control sever 16, in response to a message indicating that WT 1 18 and WT 2 20 are seeking to establish a communications session, will determine which mode of operation the devices 18, 20 should use for communication and signal the mode to the devices. When an infrastructure mode is selected, the devices will communicate via base stations A and B 12, 22 while when a direct mode is selected, they will communicate directly with each other as indicated by dashed lines 55. As should be appreciated, the communications control server 16 may determine that different modes of communication should be used for different direction of communication depending on the interference cost estimates. However in some cases the control server 16 determines that the same mode should be used for communications in each direction or a single mode is selected and used by default for both directions.

Thus in some embodiments such as the ones discussed in FIGS. 1 and 2 examples, the decision maker is the communication control server 16 which instructs the infrastructure node(s), e.g., base station(s), that are currently serving the two wireless terminals 18, 20 and/or the devices including the wireless terminals 18, 20 regarding the communications mode and/or path which should be used for communications. The instructions from the communications control sever 16 to the wireless terminals 18, 20 may be communicated via the base stations 12, 22. In some embodiments the mode decision may, and in some cases is, based on 1) the geographic location information of the two devices, 2) signal strength measurement between the two devices, and/or 3) signal strength and/or other information relating to other devices that have already established peer-to-peer communication in the vicinity of one or more of the devices 18, 20 seeking to establish a communications session. The decision may further be based on a comparison of the airlink cost of supporting the two connections formed via one or more base stations (e.g., base station A 12 and base station B 22 in the example) and that of the direct peer-to-peer communication. In some embodiments interference caused into a cell other than the cell in which the transmitting or receiving device is located is taken into consideration. In some embodiments the peer-to-peer communication may occur in a different bandwidth from the infrastructure mode communications or share the same bandwidth. In the latter case, in some embodiments the decision maker, e.g., communications control sever 16, estimates the potential interference the peer-to-peer connection may cause to other ongoing infrastructure based communications. Note that the discovery server 14 and communication control server 16 are functionalities that may be, and in some embodiments are, combined and/or co-located. Thus in some embodiments a control node which provides the functions of both the discovery server 14 and communications control server 16 is implemented and used in the system.

Figure 3:
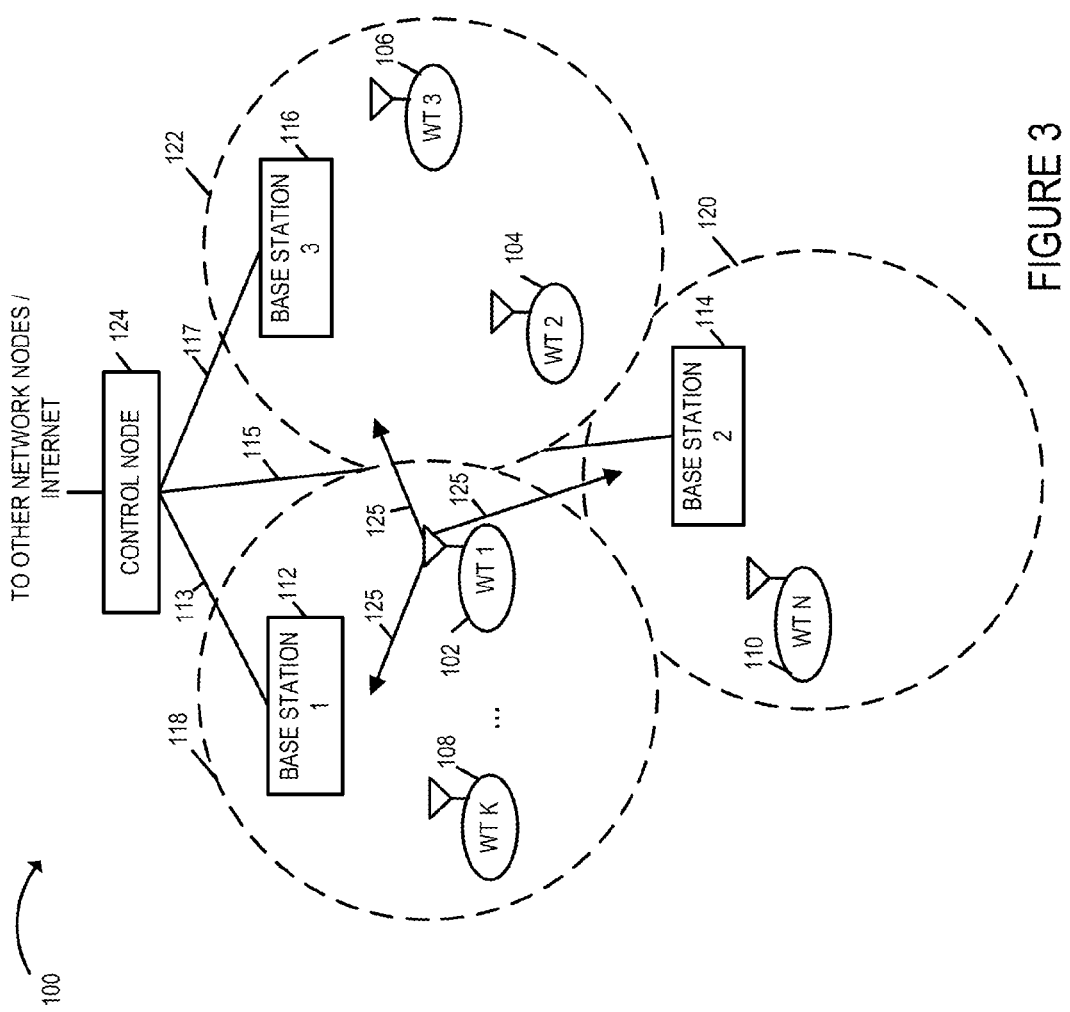
FIG. 3 is a more detailed example of a wireless communications system in accordance with an exemplary embodiment.

FIG. 3 illustrates an exemplary communications network 100, implemented in accordance with one exemplary embodiment. Exemplary communications network 100 includes a plurality of wireless communications devices, e.g., mobile wireless terminals, including wireless terminal 1 102, wireless terminal 2 104, wireless terminal 3 106, . . . , wireless terminal K 108, and wireless terminal N 110. As illustrated, the communications network 100 further includes one or more base stations including base station (BS) 1 112, base station 2 114, base station 3 116, each one having a corresponding base station coverage area as represented by the circles 118, 120 and 122. Circles 118, 120 and 122 correspond to the cell in which the respective base station 118, 120, 122 is located. Although each base station coverage area has been shown as a single sector cell in FIG. 3, in some embodiments, some or all of the base station coverage areas or cells of the network 100 may be multi-sectored. Each cell 118, 120, 122 may include a plurality of wireless terminals that can exchange information with the cell's base station (BS) via, e.g., wireless links.

The communications network 100 includes a central control device, e.g., the control node 124 which is coupled to the base stations 118, 120, 122 in the network 100, e.g., via network links 113, 115, 117. The control node 124, in some embodiments is also coupled to the Internet and other network nodes via one or more additional links. The network links may be, e.g., fiber optic links. In some embodiments the control node 124 may be implemented as a central element of the network 100 which can support and communicate with a plurality of base stations in the network 100.

The communications devices 102, 104, 106, 108, 110, may be, e.g., mobile terminals, which support direct peer to peer communications as well as communications via one or more base stations. Exemplary communications network 100, in some embodiments may also include other devices such as a discovery server 14, etc. The wireless communications devices 102, 104, 106, 108, and 110 support various signaling between peers, e.g., peer discovery signals, transmission request signals etc., and data transmissions. The communications devices 102, 104, 106, 108, 110 also support communications with infrastructure elements such as the control node 124, and base stations 112, 114, 116.

Some of the communications devices 102, 104, 108 are mobile communications devices, e.g., handheld mobile communications devices, while some others may be fixed devices in at least one embodiment. In the FIG. 3 example, WT 1 102 is shown to be transmitting signals, e.g., pilot, beacon, and/or one or more peer discovery signals 125 which are transmitted at a predetermined power level. Signals 125 can, and in various embodiments are, received by other devices in the system, and the received signal strength measured and reported to the control node 124 for use in generating interference estimates. In addition to the wireless terminals' transmitting signals at known power levels, devices including, e.g., base stations 112, 116 and 114 may also transmit such signals, e.g., pilots, beacons and/or other signals which can be measured and used for interference estimation purposes.

In accordance with one aspect, communications devices in network 100 may communicate with one another using either a direct mode of operation, e.g., a peer to peer mode of communication operation, or an infrastructure mode, e.g., a mode of operation where communications is done via one or more base station. In some embodiments the decision as to which one of the two modes of operation a device should use for communications, is made by the control node 124, as a function of one or more factors including, e.g., one or more system interference cost estimates. The interference cost estimates may be generated based on location and proximity of the communicating devices, an expected transmission power level that the transmitting device is expected to use for transmitting signals to another device with which the transmitting device is trying to communicate and/or other information including information on the received signal strength of pilot, beacon or peer discovery signals reported to the control node along with information indicating the source of the received signal and the device providing the received signal strength information.

In accordance with one embodiment, it is possible that based on one or more factors including, e.g., system interference cost estimate, the control node 124 may direct one or more devices, e.g., wireless terminals 102, 104 which are seeking to communicate, to use a direct mode of operation for communications, e.g., using peer to peer signaling. For example, if the control node 124 determines that the communications devices 102, 104 are sufficiently close to each other the control node 124 may decide that it may be more efficient, from an overall system interference perspective, for the communications devices 102, 104 to communicate directly rather than communicate via one or more base stations. In such a scenario, the control node 124 may, and in some embodiments does, instructs the devices 102, 104, via the base stations 112, 116 to communicate with each other directly without the need of one or more base stations to be involved in the communication between the two devices in terms of relaying or forwarding information or signals. It should be appreciated that the determination regarding the suitable mode of operation in some embodiments, is independently made for each direction of communication, for example, a first determination may be made for communications from WT 1 102 to WT 2 104 and a second independent determination may be made with regard to the mode of communication to be used for communications from WT 2 104 to WT 1 102. In such embodiments, the determined mode of operation may be different in each direction. In other embodiments, a single determination is made and the selected mode of operation is used for communications in both directions between WT 1 102 and WT 2 104.

Figure 4:
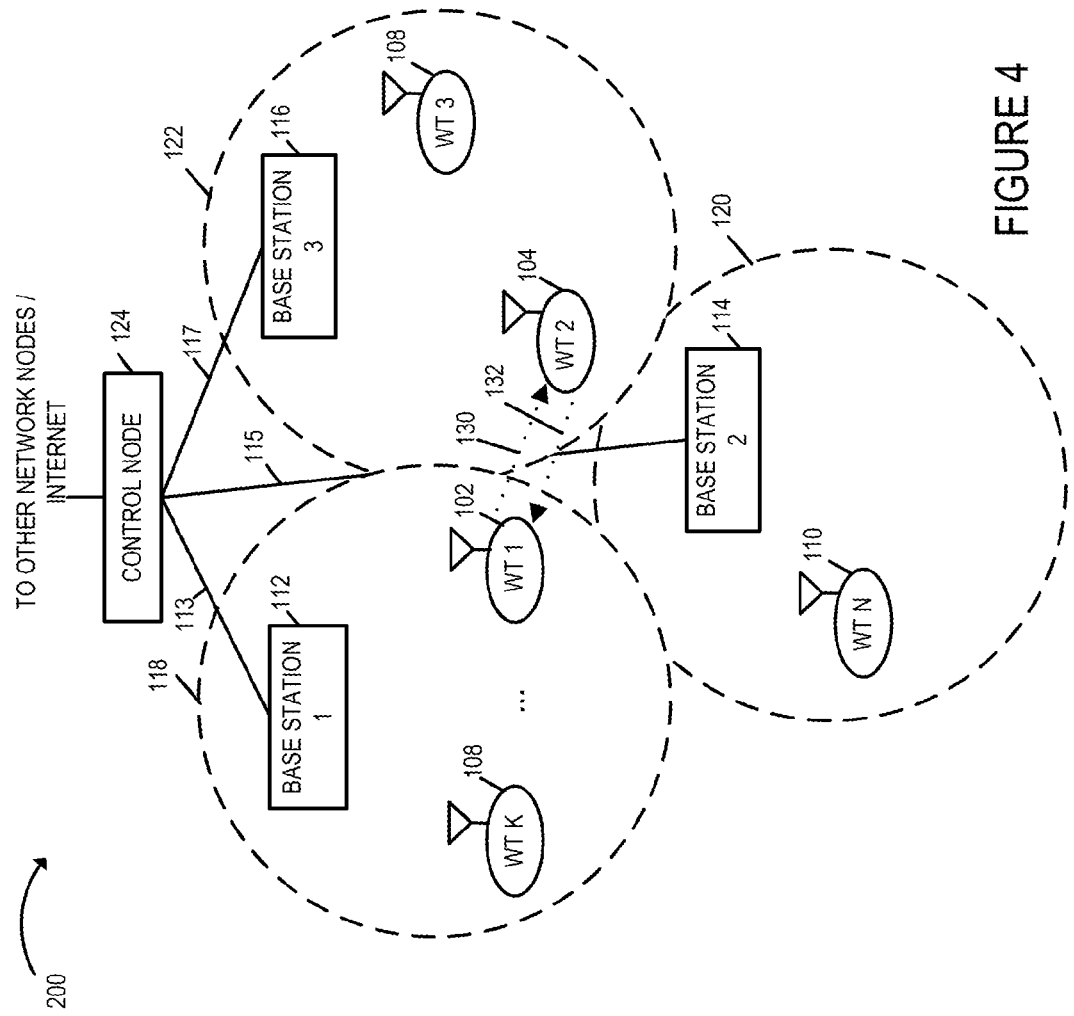
FIG. 4 illustrates communications between two communications devices which may occur in the system shown in FIG. 3, in which a direct, e.g., peer to peer, communications mode of operation is used.

FIG. 4 is a drawing 200 illustrating an example showing communications between two communications devices 102, 104 in the system shown in FIG. 3, using a direct mode of operation in both directions, in accordance with one exemplary embodiment.

In the FIG. 4 example, wireless terminal WT 1 102 in the first base station coverage area 118 is shown communicating with another wireless terminal, i.e., WT 2 104 after being instructed by the control node 124 to communicate in such a manner, e.g., in response to receiving a message or other indication that the first and second wireless terminals 102, 104 are seeking to communicate.

Figure 5:
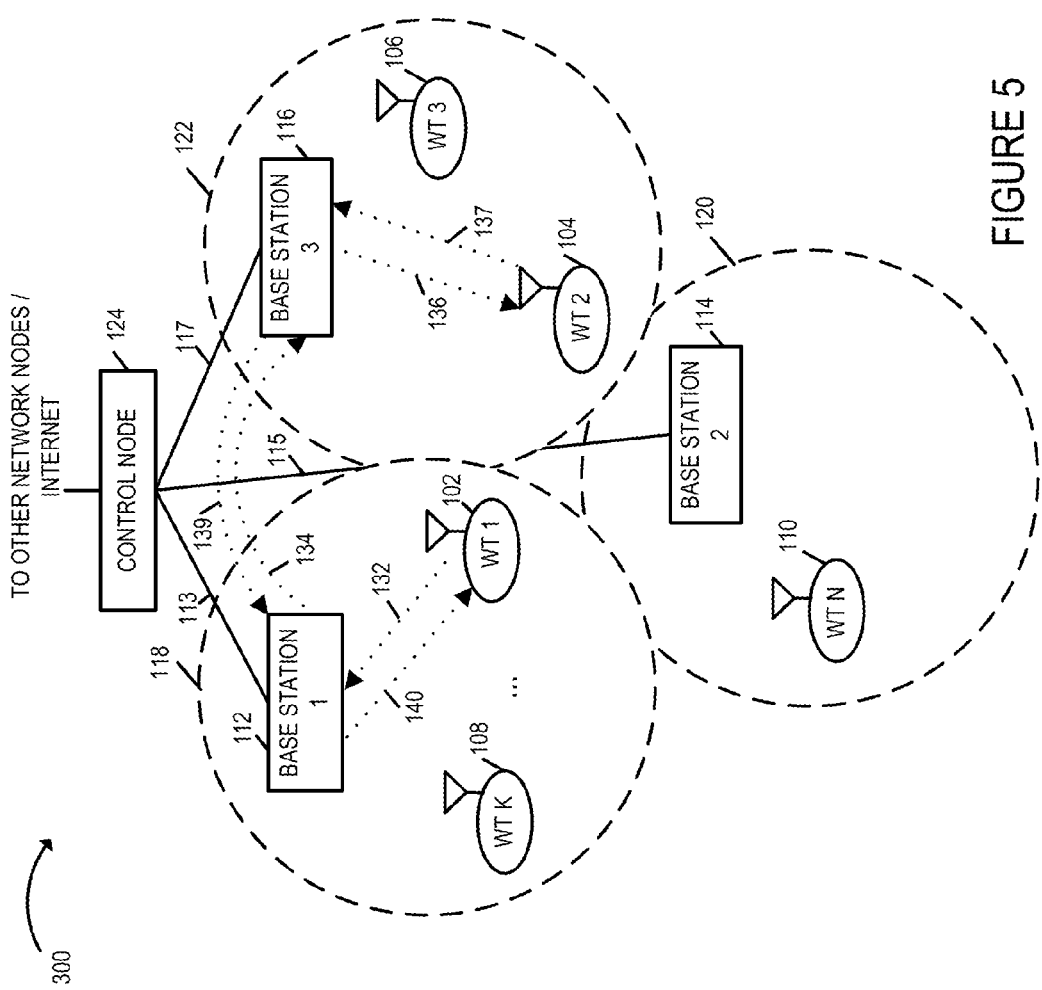
FIG. 5 illustrates communications between two devices which may occur in the system shown in FIG. 3 when an infrastructure mode of operation is used for communications between the two devices.

FIG. 5 is a drawing 300 illustrating an exemplary scenario in which two communications devices of network 100 are communicating using an infrastructure mode of operation, in accordance with one exemplary embodiment, for communication in both directions between the two wireless terminals WT1 102 and WT 2 104. Such communication may follow the control node 124 directing WT1 102 and WT 2 to communicate in both directions using infrastructure mode operation to communicate, e.g., because one or more interference cost estimates indicated that this was the most efficient communications mode from a system interference cost perspective. In such a scenario, the devices 102, 104 communicate with each other via one or more base stations 112, 116 and/or the backhaul network interconnecting the base stations.

The communications from WT 1 102 to WT 2 104, via base station 1 112 and base station 3 116 are shown using arrows 132, 134 and 136. Thus in this example, using the infrastructure mode the information and/or data may be transmitted from WT 1 102 to base station 1 112 (as represented by arrow 132), the base station 1 112 can send the communicated information to the base station 3 116 which is currently serving the area where WT 2 102 is located, via backhaul (represented by 134) and finally base station 3 116 communicates the information to WT 2 104 (represented by arrow 136). In this particular example, it is assumed that the determined second mode of operation for the reverse direction i.e., from WT 2 104 to WT 1 102, is also the infrastructure mode of operation. Thus communications in the reverse direction using infrastructure mode of operation are shown using arrows 137, 139 and 140.

Figure 6:
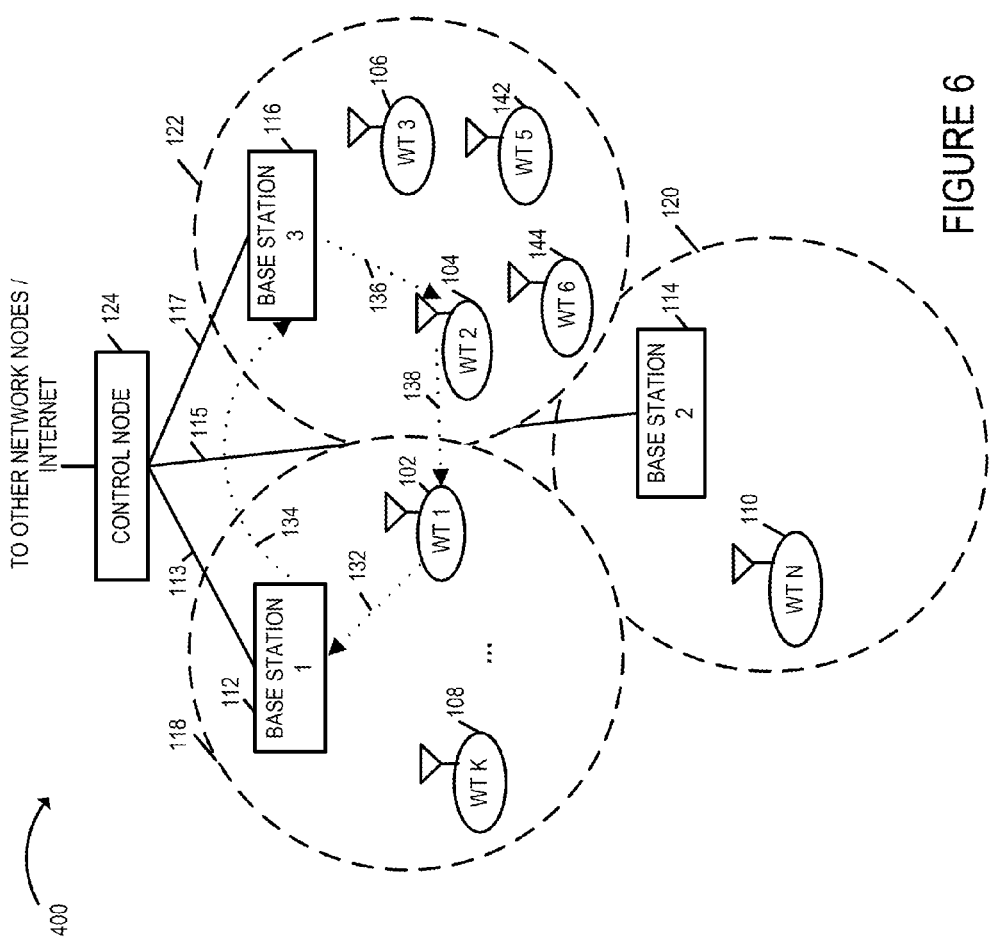
FIG. 6 illustrates yet another example of communications between two devices which may occur in the system shown in FIG. 3 but with a direct mode of communications operation being used in one direction and an infrastructure mode of communication operation in the reverse direction as may occur in some exemplary embodiments.

FIG. 6 is a drawing 400 illustrating yet another exemplary scenario in which communications from a device, e.g., WT 1 102 to a second device, e.g., WT 2 104, is achieved using an infrastructure mode of operation while in communications in the reverse direction, i.e. from WT 2 104 to WT 1 102 is done using a direct mode of operation. Such a communications scenario occurs when the control node 124 direct the communicating devices 102, 104 to use an infrastructure mode in one direction (e.g., from WT 1 102 to WT 2 104) while directing the communicating devices 102, 104 to use direct peer to peer mode of operation in the reverse direction (e.g., from WT 2 104 to WT 1 102). This may occur, e.g., when a comparison made by the control node 124 indicates that a direct communications mode interference cost estimate to an infrastructure mode cost estimate for communications from WT 1 102 to WT 2 reveals that use of infrastructure mode communications mode for communications from WT 1 to WT 2 results in less interference cost, in terms overall interference cost to the systems, than direct mode compunctions. However, in this example with regard to the reverse direction, the control node 124 selected the direct mode for the communications from WT 104 to WT 1 102 since the interference cost estimates for direct and infrastructure mode communications indicated that direct mode communication was preferable from a system interference perspective for communications from WT 2 104 to WT 1 10. and infrastructure interference cost estimates for communication from WT 1, 102 to WT 2 104.

While some examples discussed above have been used to describe various features, the method used in some embodiments will become even clearer when considered in view of the flow chart shown in FIG. 7.

Figure 7B:
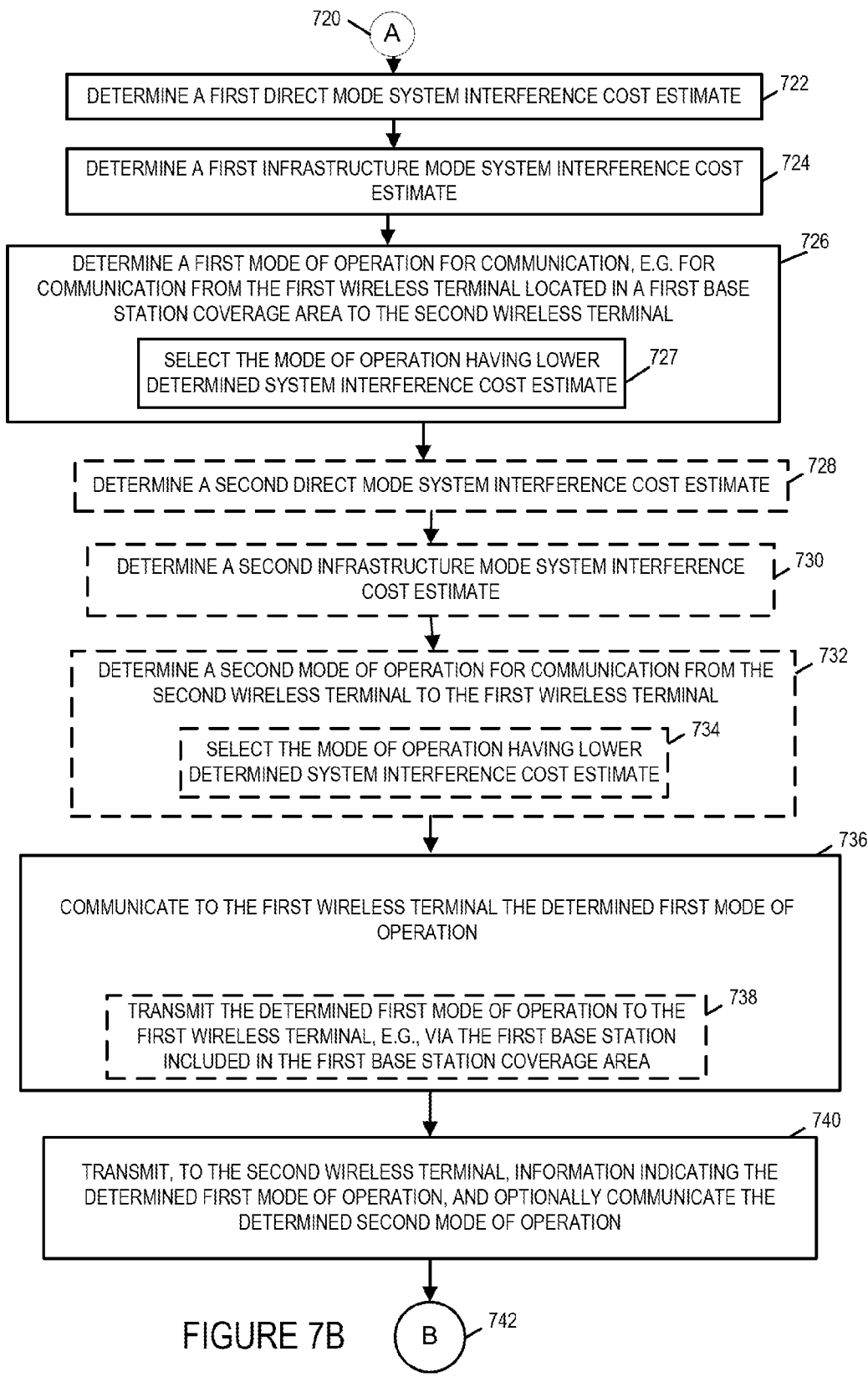
FIG. 7B, which in combination with FIG. 7A comprises

FIG. 7, which comprises the combination of FIGS. 7A and 7B, is a flowchart 700 showing the steps of an exemplary method of operating a control device, in accordance with an exemplary embodiment. The control device can be, e.g., the control node 124 shown in FIG. 3. To facilitate better understanding of the method 700, reference to FIGS. 3-6 maybe made.

As shown in FIG. 7A, operation starts in step 701. In step 701 the control node 124 is powered on, initialized and begins monitoring for messages and/or other signals. Each of the arrows extending out of step 701 corresponds a processing path associated with a different type of signal or information which may be received. Thus, operation proceeds from start step 701 along three parallel paths, to steps 702, 704 and 710 respectively. In some embodiments steps 702, 703 and 710 may occur asynchronously, e.g., in parallel. In step 702 the control node 124 receives network topology/configuration information which provides information regarding the configuration of the network 100. The operation proceeds from step 702 to step 703 where the received network topology information is stored, e.g., in a memory. Operation proceeds from step 703 back to step 702 where the control node 124 waits to receive further topology updates. Network topology information, e.g., base station location, sectorization and frequency band usage information may be updated in response to changes in the system such as the addition or elimination of a base station and corresponding cell. Network topology information is stored for future use, e.g., in generating interference cost estimates. The network topology information may provide information on adjacent cells and thus which cells should be considered when generating an interference cost estimate based on expected transmissions in a cell. Network topology information may also include information on the frequency band or bands to be used for peer to peer signaling in different locations in the system. For example, in some cells, the frequency band used for direct, e.g., peer to peer communication, is different from the frequency band used for infrastructure mode communications. In other embodiments and/or in some cells, the infrastructure mode and direct mode may use the same frequency band for communications purposes. The frequency band to be used for direct and infrastructure mode communications is stored as part of the network topology information, e.g., on a per cell and/or per sector basis.

In addition to receiving and storing network related topology information, the control node may receive and store interference information which may, and in some embodiments is, used to generated interference cost estimates. The receipt and storage of interference information may occur over a period of time, e.g., in parallel with the updating and storage of network topology information and the actual generation and use of interference cost estimates as part of a communications mode determination process.

In step 704 the control node 124 receives interference information from base stations and/or wireless terminals. In step 704 pilot, beacon and/or other signal measurement information, e.g., the results of signal measurements made by wireless terminals and/or base stations may be received by the control node. Beacon ratio reports and transmission power level information may also be received. This information can be used in predicting the interference cost of a particular mode of operation under consideration, e.g., direct or infrastructure mode.

Step 704 includes step 705 of receiving interference information from a second base station, e.g., base station 2 114, said interference information including at least one of i) interference information determined by the base station 2 114 from a signal received by the base station 2 114 from the first wireless terminal 1 102, and ii) interference information determined by a third wireless terminal in a second base station coverage area, e.g., coverage area 120, which was reported to the second base station 2 114.

Consider for example, the system shown in FIG. 3. Base station 2 114 which is located adjacent the base station coverage area 118 where WT 1 102 is located, receives signal 125 which may be, e.g., a pilot or beacon signal broadcast by the WT 1 102. The base station 2 114 may measure the strength of the received signal which, from second base station's perspective is interference from the neighboring cell due to transmissions by WT 1 102. The received signal strength of the signal transmitted at a known power level, e.g., pilot signal or control channel signal transmitted at a controlled known power level, can be used to predict interference which will be caused by transmission by WT 1 at other power levels, e.g., power levels expected for peer to peer or infrastructure mode transmissions. It should be appreciated that although base station 2 114 is being considered as the second base station in this example, another base station, e.g., base station 3 116, which is adjacent the base station coverage area 118 where WT 1 102 is located may and in some embodiments does also take and report various measurements to the control node. Such measured values and/or reports represent interference information which can be used by the control node in generating interference cost estimates. In some embodiments the interference information is generated by a third wireless terminal, e.g., WT N 110 in coverage area 120, WT 2 104 in the coverage area 122, which measures received signals and reports the measurement results to the base station serving the cell where the wireless terminal making the interference measurements is located. For example, WT N 110 reports interference measurements to base station 2 114 which uses them and relays them to the control node 124. WT 2 104 makes the interference measurements and reports the interference measurements to base station 3 116. The base stations 112, 114, 116, communicate all or some of the received interference information to the control node 124. In some embodiments interference information reported by wireless terminals is in the form of a beacon ratio report which may be a report of the measured strength of a beacon or pilot from one base station relative to the measured strength of beacon or pilot from another base station. Such interference reports provide an indication of the relative channel condition from the wireless terminal to the base stations from which the beacons signals used to generate the report were receive and can be used in predicting interference that will be generated by the wireless terminal to the base station or base stations.

In some embodiments step 704 further includes an optional step 706 as indicated in the flowchart by the dashed box, and is performed in some embodiments while skipped in other embodiments. In step 706 the control node 124 receives interference information from a base station, e.g., from base station 2 114 or base station 1 112, outside the coverage area where the second wireless terminal WT 2 104 is located, said information including at least one of: i) interference information determined by said base station from a signal received by said base station from the second wireless terminal WT 2 104, and ii) interference information determined by another wireless terminal in the coverage area of said base station which was reported to said base station.

The interference measurements may be made by several base stations and/or wireless terminals operating in neighboring cells in the network 100, periodically or non periodically, using broadcast signals, e.g., pilot or beacon, from communications devices which are trying to communicate with other devices in the network 100. The interference information is then reported to the control node 124. Operation proceeds from step 704 to step 708 wherein the received interference information is stored. Operation proceeds from step 708 back to step 704 in which additional interference information may be received and stored, e.g., on an ongoing basis. Updated information for a particular wireless terminal and/or base station may replace older information as the new interference information is received and stored.

As noted above, in addition to receiving various types of information useful in generating interference cost estimates, the control node 124 is also responsible for receiving and processing messages indicating that devices are seeking to establish communication with each other and for responding with information indicating the mode of operation, direct mode or infrastructure mode, which should be used for the communication. Receive step 710 marks the start of the processing path associated with messages relating to communications establishment between a pair of devices.

In step 710 the control node 124 receives a message indicating and intent or desire to establish communications between devices, e.g., between a first wireless terminal, e.g., WT 1 102 and a second wireless terminal, e.g., WT 2 104. In some embodiments WT 1 102 may communicate such a request received in step 710 to the control node 124 through the serving base station 1 112. In other embodiments, the message indicating an intent or desire to establish a communications session may come from a node such as the peer discovery server 14 which may determine that two nodes in the vicinity of one another are of interest to one another and may want to communicate. Operation proceeds from step 710 to step 722 via connecting node A 720.

In step 722 the control node 124 determines a first direct mode system interference cost estimate based on the stored interference information. The first direct mode system interference cost estimate is an estimate of the interference cost of the system that will be caused if the nodes seeking to communicate are allowed to communicate directly, e.g., in a first direction in embodiments where separate unidirectional cost estimates are generated or bi-directionally in cases where a single interference cost estimate is generated for the purposes of bi-directional communications mode decisions.

A system interference cost estimate, in some but not necessarily all embodiments, is generated as a sum of individual interference cost estimates generated for multiple cells or coverage areas which are likely to be affected by the communication session. Accordingly, in various embodiments, when a system interference cost estimate is generated, it takes into consideration the interference caused in multiple individual base station coverage areas which will be caused by the mode of operation for which the interference cost estimate is being generated.

For example, a first direct mode system interference cost estimate can be determined for communications from WT1 and WT2 by calculating the sum of expected interference costs that may be caused in each of the base station coverage areas 118, 120, 122, if the WT 1 102 and the WT 2 104 communicate using direct mode of operation, i.e., peer to peer communications.

A direct mode interference cost estimate may be generated and expressed as a sum of interference cost estimates for the different cells in the system which will be affected by the communication.

Direct mode system interference cost estimate (DMSICE)

$$= \Sigma_{i=1 \text{ to } n}(DMI_{cell\ i}) = (DMI_{cell\ 1} + DMI_{cell\ 2} + \ldots + DMI_{cell\ n})$$

where $DMI_{cell\ 1}$ represents Direct Mode Interference Cost for Cell 1, $DMI_{cell\ 2}$ represents Direct Mode Interference Cost for Cell 2 and so on.

The interference cost for an individual cell may be generated in a plurality of ways. Expected transmission power levels may be taken into consideration in generating the interference cost estimates in addition to various other factors such as base station loading in one or more cells, the location of the devices which will be transmitting, the sectorization or antenna configurations of the base stations which are transmitting and/or receiving, etc.

Operation proceeds from first direct mode system interference cost estimation step 722 to step 724 which is a first infrastructure mode system interference cost estimation step. In step 724 the control node 124 determines a first infrastructure mode system interference cost estimate, e.g., based on expected interference caused to both the first base station coverage area 118 and the second base station coverage area 120 if the first wireless terminal WT 1 102 and the second wireless terminal WT 2 104 communicate using infrastructure mode of operation, e.g., through a base station. If the system determines the communications modes for the different directions independently, the first infrastructure mode system interference cost estimate will be for a single direction of communication operation while if the first infrastructure mode system interference cost estimate will be used for making a bi-directional communications the cost estimate may be for bi-directional communications. The first direct mode system interference cost estimate 722 is the counterpart to the first infrastructure mode system interference cost estimate 724 with both estimates being generated for the same communications case, e.g., uni-directional communications or bi-directional communications.

In some embodiments, the system interference cost estimate for the infrastructure mode is the sum of individual interference cost estimates generated for individual cells or coverage areas.

Infrastructure mode system interference cost estimate (IMSICE)

$$IMSICE = \Sigma_{i=1 \text{ to } n}(IMI_{cell\ i}) = (IMI_{cell\ 1} + IMI_{cell\ 2} + \ldots + IMI_{cell\ n})$$

where $IMI_{cell\ 1}$ represents Infrastructure Mode Interference Cost for Cell 1 (e.g., expected interference cost to cell 1 when WT 1 102 communicates with WT 2 104 using infrastructure mode), $I\ I_{cell\ 2}$ represents Infrastructure Mode Interference Cost to Cell 2 and so on. The Infrastructure Mode Interference Cost estimate for a cell may be generated using a variety of techniques. For example, reported beacon ratio reports and/or other information can be used to generate an Infrastructure Mode Interference Cost estimate for a cell.

Direct mode and infrastructure mode system interference cost estimates may, in some embodiments do, correspond to different frequency bands. For example, when the direct communications mode uses a first communications band which is different from a second communications band used for infrastructure mode communication, the direct communications mode and infrastructure communications mode interference cost estimates will correspond to different frequency bands. In some, but not necessarily all embodiments the infrastructure mode frequency band is used to notify communications devices, e.g., wireless terminals, of the communications mode to use even if the direct communications mode is selected to be used.

Operation proceeds from step 724 to step 726. In step 726 the control node 124 determines a first mode of operation for communication, e.g., for communication from the first wireless terminal to the second wireless terminal. Of course, in the case where the terminals use the same mode for both directions as opposed to separate mode determinations for each direction, the determined first mode of operation is also to be used for communication from the second wireless terminal to the first wireless terminal.

In some embodiments the first mode of operation is selected in step 726 by comparing the value of the first direct mode interference cost estimate generated in step 722 to the value of the first infrastructure mode system interference cost estimate generated in step 724 and then selecting, in sub-step 727, the mode corresponding to the lower of the two interference cost estimates as the first mode of operation.

When one of the wireless terminals seeking to communicate is in a different base station coverage area, e.g., cell than the first wireless terminal. The interference cost estimates and resulting mode determination will be a function of the interference cost to multiple cells.

For example, consider when WT 1 102 located in the first base station coverage area seeks to communicate to the second wireless terminal WT 2 104. The mode determination is made as a function of interference which will be caused in a second base station coverage area adjacent said first base station coverage area. The mode determination selects between one of the direct mode of operation and the infrastructure mode of operation. In some embodiments the first base station coverage area is a coverage area of the first station 112 (i.e., coverage area 118) and the second base station coverage area is the coverage area of the second base station 114 located adjacent said first base station (i.e., coverage area 120). In some embodiments the second wireless terminal WT 2 104 is located in the second base station coverage area 120. In some embodiments the first and second wireless terminals WT 102, 103 are located in the first base station coverage area 118. In some embodiments the step of determining the first mode of operation is a function of the direct mode system interference cost estimate and an infrastructure mode system interference cost estimate.

In some embodiments, the determined first mode of operation is considered as a default mode of operation for communications from the second wireless terminal WT 2 104 to the first WT 1 102. In such embodiments, the first mode determination serves as a bi-directional mode determination even though the decision may be based on a set of uni-directional interference costs estimates interference costs without the generation of a second set of cost estimates for communication from the second wireless terminal WT 2 104 to WT 1 102.

In some such embodiments determining the first mode of operation is a function of interference which will be caused in a base station coverage area other than a base station coverage area in which said second wireless terminal WT 2 104 is located.

Operation proceeds from step 726 to step 728 in cases where a separate mode of operation determinations are made for each direction of communication or directly to step 736 in embodiments where a single mode of operation determination is made for both modes of operation. Thus, steps 728, 730 and 732 are optional steps which are skipped in some embodiments.

In step 728 the control node 124 determines a second direct mode system interference cost estimate, e.g., an interference cost estimate corresponding to communication from the second wireless terminal WT 2 104 to the first wireless terminal WT 102.

The second direct mode system interference cost estimate may be determined in the same or in a similar manner to the way in which the first direct system cost estimate discussed earlier in step 722 was generated but taking into consideration that the second WT 2 104 will be the transmitting device for purposes of determining the second direct mode system interference cost estimate.

It should be appreciated that individual interference cost estimates corresponding to communications from WT 2 104 to WT 1 102, for different areas or devices which may be summed to generate the system interference cost estimate, are likely to be different than those generated for communication in the other direction since the devices in the proximity to the transmitting device WT 2 104, which is the transmitting device for this interference determination, are different than those in the immediate vicinity of WT 1 102 which is the transmitter for communications from WT 1 102 to WT 2 104.

Operation proceeds from step 728 to step 730. In step 730 the control node 124 determines a second infrastructure mode system interference cost estimate.

For example, in the FIG. 3 example the second infrastructure mode system interference cost estimate may be based on, e.g., a sum of, expected interference caused to both the first base station coverage area 118 and the coverage area of base station coverage area 122 where WT 2 104 is located assuming communication through a base station. The second infrastructure mode system interference cost estimate may, and in some embodiments is, determined in the same or similar manner to the way in which the first infrastructure mode system cost estimate is generated. Thus the second infrastructure mode system interference cost estimate can be determined by calculating the sum of expected interference costs that may be caused in each of the base station coverage areas 118, 120, 122, if WT 2 104 communicates with WT 1 102 using infrastructure mode, e.g., through one or more base stations as shown in FIG. 5.

Operation proceeds from step 730 to step 732. In step 732 the control node 124 determines a second mode of operation for communication from the second wireless terminal WT 2 104 to the first wireless terminal WT 1 102. The second mode of operation is one of a direct mode of communication operation and an infrastructure mode of communication operation. The determination may be made by comparing the interference cost estimates for the direct and infrastructure modes of operation and selecting, e.g., in sub-step 734, the mode with the lower cost estimate.

In the FIG. 3 exemplary embodiment the determination is made as a function of interference which will be caused in a base station coverage area other than a base station coverage area in which WT 2 104 is located. In the FIG. 3 example being discussed the base station coverage area in which WT 2 104 is located is area 122. However in some other embodiments WT 2 104 could be located elsewhere. Thus, in the present example, the determination of the second mode of operation for communications from WT 2 104 to WT 1 102 is made as a function of the interference which will be caused to the neighboring base station coverage area, e.g., in coverage areas 118, 120. In some embodiments, determining the second mode of operation is a function of the second direct mode system interference cost estimate and the second infrastructure mode system interference cost estimate.

Operation proceeds from step 732 which includes sub-step 734 to communication step 736.

In step 736 the control node 124 communicates to the first wireless terminal WT 1 102 at least the determined first mode of operation to be used for communication from the first wireless terminal WT 1 102 to the second wireless terminal WT 2 104. In step 736, the control node 124 may, optionally, also communicate the determined second mode of operation to be used for communication from the second wireless terminal WT 2 104 to the first wireless terminal WT 1 102. In some embodiments the step of communicating the first determined mode of operation includes performing transmitting 738 information, e.g., a message, indicating the determined first mode of operation to the first wireless terminal WT 1 102 via a base station. The transmission to WT 1 102 maybe, for example, in the case of the FIG. 3 example, via base station 112 in the first base station coverage area 118.

Operation proceeds from step 736 to step 740. In step 740 the control node 124 transmits, to the second wireless terminal WT 2 104, information indicating the determined first mode of operation. In cases where a second mode of operation was determined, the determined second mode of operation may also be communicated. Since a second mode may not be determined in all embodiments, the communication of the determined second mode of operation is optional and will not occur when a second mode of operation is not determined.

In some embodiments transmitting to the second WT 2 104, information indicating the determined first mode of operation is via a base station. For example, in the FIG. 3 example the transmission may be via base station 3 116 which serves the coverage area 122 in which WT 2 104 is located. In some other embodiments transmitting to the second WT 2 104, information indicating the determined first mode of operation is via the first wireless terminal, e.g., via a direct transmission from the first wireless terminal WT 1 102 to the second wireless terminal WT 2 104. In a similar manner, information indicating the determined second mode of operation for communications from WT 2 104 to WT 1 102 can be transmitted to the first wireless terminal WT 1 102 via a base station, e.g., base station 1 112. In other embodiments the communication maybe via a transmission from the second wireless terminal WT 2 104 to the first WT 1 102, e.g., when the second mode is to be a direct mode of communication.

Thus, the control node 124 ensures that the communications devices that wish to communicate with one another are informed about the suitable mode of operation to communicate in each direction of communication before they start communicating. Thus, the wireless terminals will communicate using a mode which is cost effective from a system wide interference perspective.

With the communications devices seeking to communicate having been informed of the mode of communications operation to use, operation proceeds from step 740 back to 710 via connecting node B 742 wherein the control node proceeds to receive and begin processing another message indicating an intent to establish communication between two wireless terminals.

Figure 8:
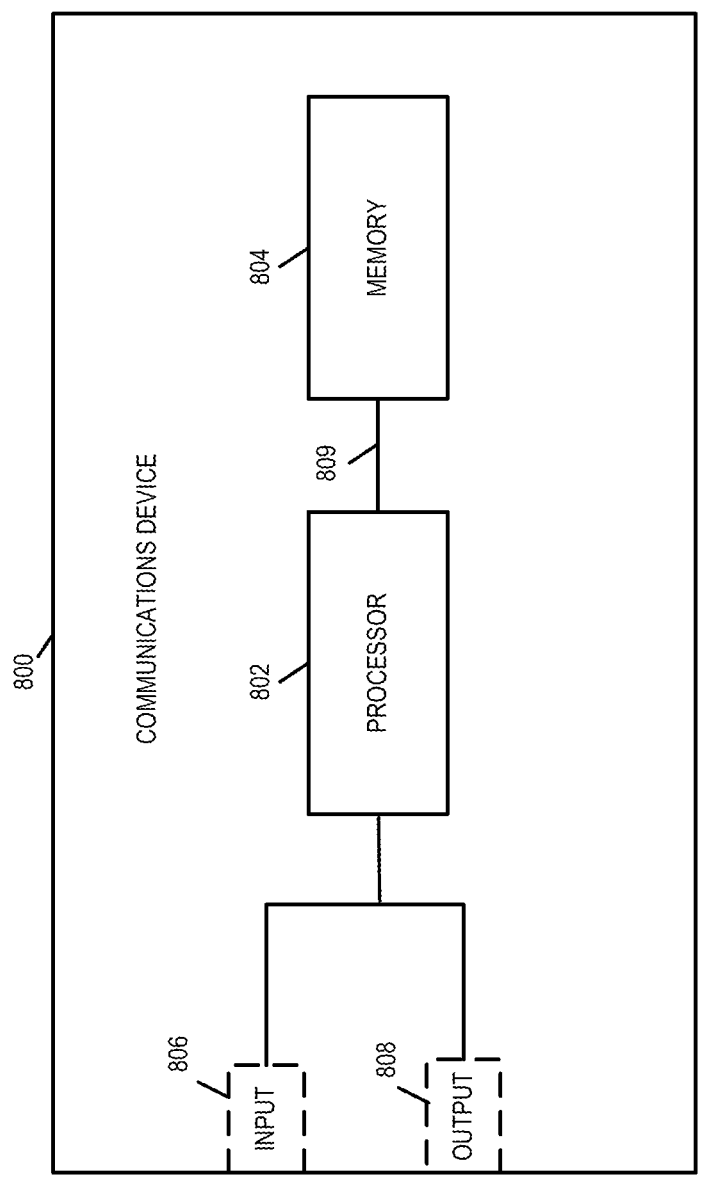
FIG. 8 illustrates an exemplary control device which can be used as the control node shown in the exemplary system shown in FIGS. 3-6.

FIG. 8 is a drawing of an exemplary communications device 800, e.g., a control node, in accordance with one exemplary embodiment. Communications device 800 can be implemented as the control node 124 shown in FIG. 3. In some embodiments communications device 800 is a network device implementing a method in accordance with flowchart 700 of FIG. 7. Communications device 800 includes a processor 802 and memory 804 coupled together via a bus 809 over which the various elements (802, 804) may interchange data and information. Communications device 800 further includes an input module 806 and an output module 808 which may be coupled to the processor 802 as shown. However, in some embodiments the input module and output module 806, 808 are located internal to the processor 802. Input module 806 can receive input signals. Input module 806 can, and in some embodiments does, include a wireless receiver and/or a wired or optical input interface for receiving input. Output module 808 may include, and in some embodiments does include, a wireless transmitter and/or a wired or optical output interface for transmitting output.

Processor 802, in some embodiments, is configured to determine a first mode of operation for communication from a first wireless terminal, e.g., WT 1 102, located in a first base station coverage area, to a second wireless terminal, e.g., WT 2 104 as a function of interference which will be caused in a second base station coverage area adjacent said first base station coverage area, said first mode of operation being one of a direct mode of operation and an infrastructure mode of operation, and communicate to the first wireless terminal WT 1 102 the determined first mode of operation to be used for communication from the first wireless terminal WT 1 102 to the second wireless terminal WT 2 104. In some embodiments the first base station coverage area is a coverage area of a first base station and said second base station coverage area is a coverage area of a second base station located adjacent said first base station.

In some embodiments the processor 802 is configured to receive network topology information and store the network topology information. Processor 802 is further configured to receive interference information from base stations and/or wireless terminals. Processor 802 in some embodiments is further configured to store the received interference information, e.g., in memory 804. The processor 802 is further configured to receive interference information from the second base station, said interference information including at least one of: i) interference information determined by said second base station from a signal received by said second base station from the first wireless terminal and ii) interference information determined by a third wireless terminal in the second base station coverage area which was reported to said second base station.

Processor 802 is further configured to determine a direct mode system interference cost estimate based on expected interference, if the first and second wireless terminals communicate using the direct mode of operation, to both the first base station coverage area and the second base station coverage area. The processor 802 is further configured to determine an infrastructure mode system interference cost estimate based on expected interference, if the first and second wireless terminals communicate using the infrastructure mode, to both the first base station coverage area and the second base station coverage area. In some embodiments determining a first mode of operation is a function of the direct mode system interference cost estimate and the infrastructure mode system interference cost estimate.

In some embodiments the processor 802 is further configured to select, as part of determining the first mode of operation, the mode of operation having the lower determined system interference cost estimate. In some embodiments the second wireless terminal WT 2 104 is located in the second base station coverage area, e.g., area 120. In some embodiments the first and second wireless terminals are located in the first base station coverage area, e.g., area 118.

Processor 802 in at least one embodiment is further configured to determine a second mode of operation for communication from the second wireless terminal WT 2 104 to the first wireless terminal WT 1 102 as a function of interference which will be caused in a base station coverage area other than a base station coverage area in which said second wireless terminal is located, said second mode of operation being one of said direct mode of operation and said infrastructure mode of operation. The processor 802 is further configured to communicate to the second wireless terminal WT 2 104 the determined second mode of operation to be used for communication from the second wireless terminal WT 2 104 to the first wireless terminal WT 1 102.

In some embodiments the processor 802 is further configured to transmit the determined first mode of operation to the first wireless terminal WT 1 102 via a first base station included in the first base station coverage area. The processor 802 is further configured to transmit, to the second wireless terminal WT 2 104, information indicating the determined first mode of operation. In some embodiments the processor 802 is configured to transmit to the second wireless terminal WT 2 102 information indicating the determined first mode of operation via a second base station.

In some embodiments determining the first mode of operation is also a function of interference which will be caused in a base station coverage area other than a base station coverage area in which the second wireless terminal WT 2 104 is located, if the determined first mode is used for communication from said second wireless terminal WT 2 104 to the first wireless terminal WT 1 102.

Figures 9, 9A:
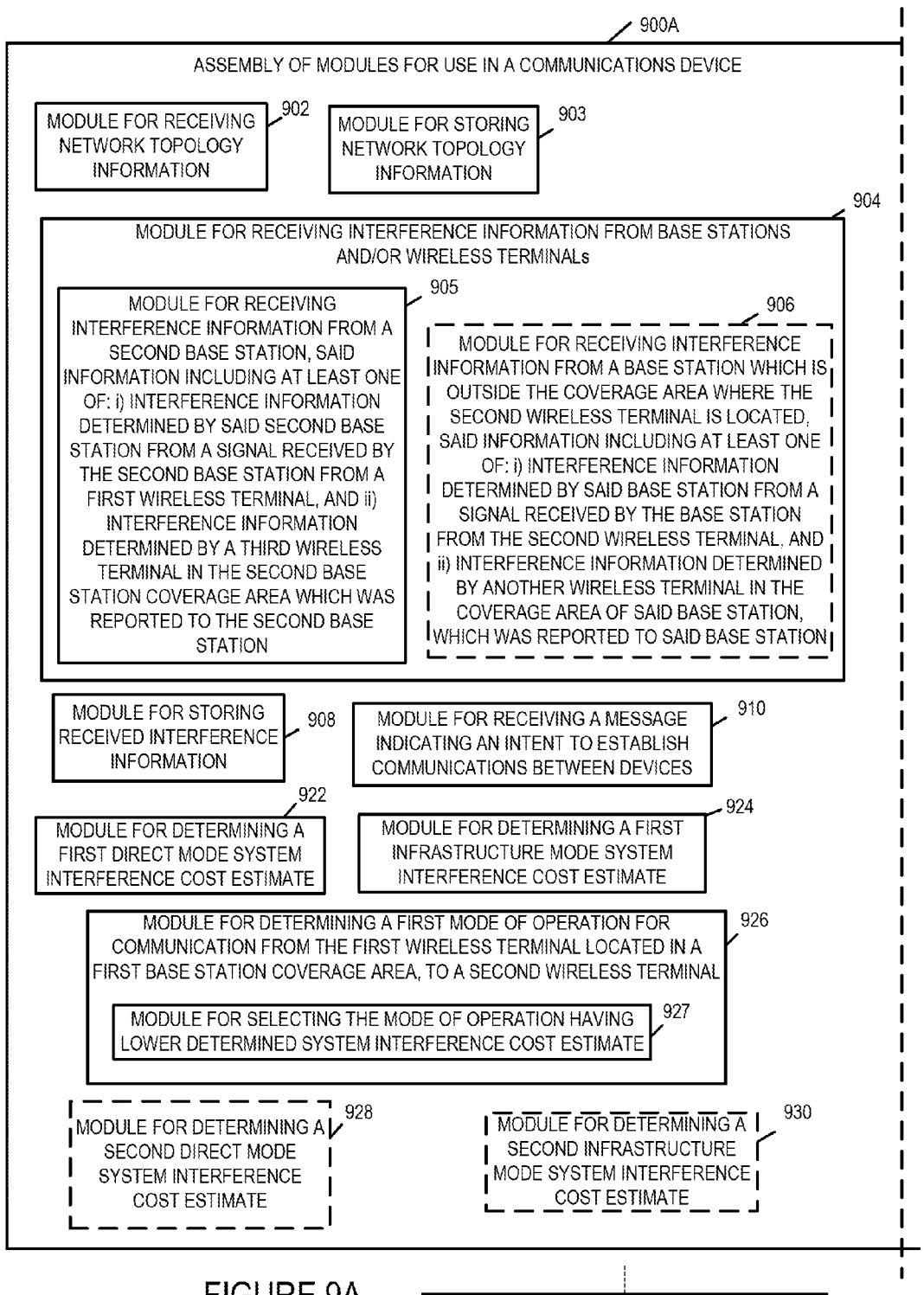
FIG. 9A illustrates a first portion of an assembly of modules which can be used in the exemplary control device shown in FIG. 8.
Figure 9B:
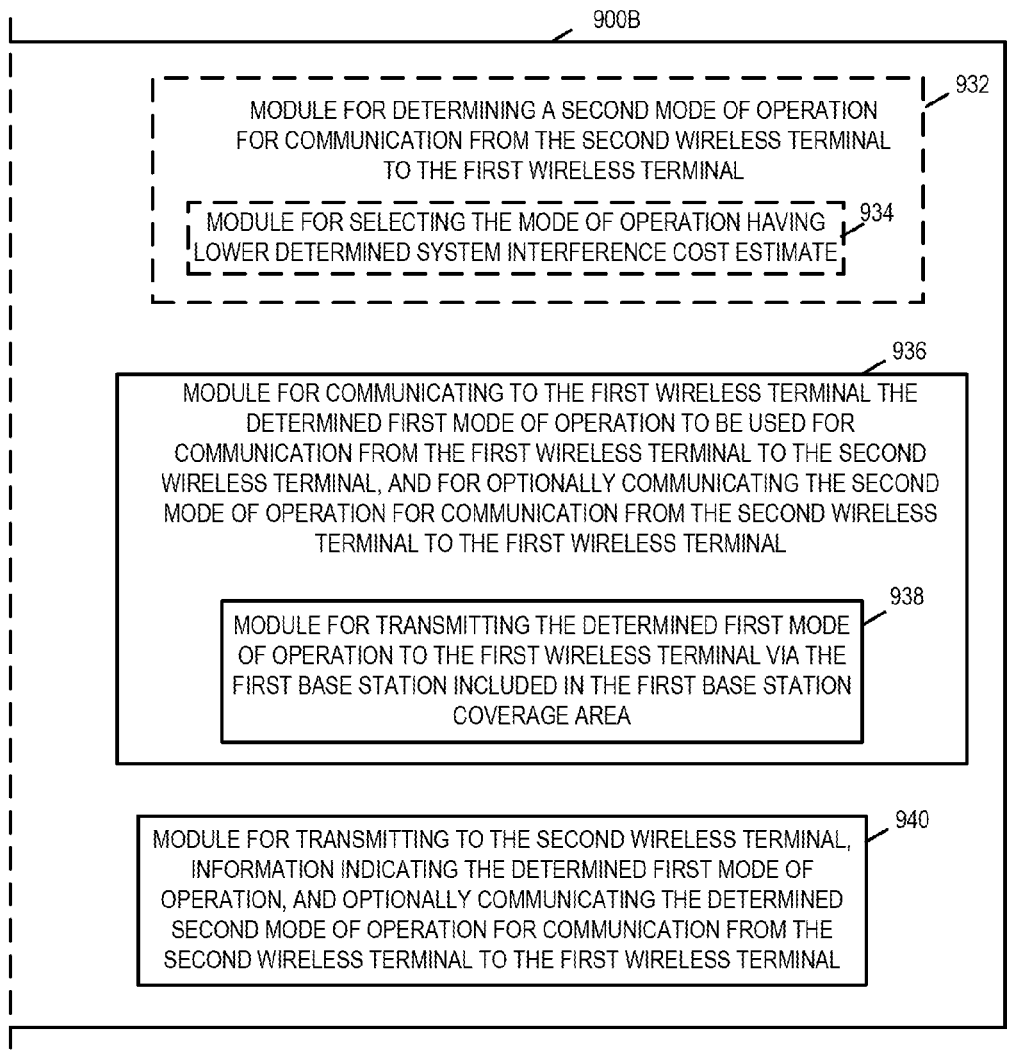
FIG. 9B illustrates a second portion of an assembly of modules which can be used in the exemplary control device shown in FIG. 8.

FIG. 9, comprising the combination of FIG. 9A and FIG. 9B, is an assembly of modules 900 which can, and in some embodiments is, used in the control device, e.g., control node 800, illustrated in FIG. 8. Assembly of modules 900 includes first portion 900A and second portion 900B. The modules in the assembly 900 can be implemented in hardware within the processor 802 of FIG. 8, e.g., as individual circuits. Alternatively, the modules may be implemented in software and stored in the memory 804 of the communications device 800 shown in FIG. 8. While shown in the FIG. 8 embodiment as a single processor, e.g., computer, it should be appreciated that the processor 802 may be implemented as one or more processors, e.g., computers.

When implemented in software the modules include code, which when executed by the processor 802, configure the processor to implement the function corresponding to the module. In embodiments where the assembly of modules 900 is stored in the memory 804, the memory 804 is a computer program product comprising a computer readable medium comprising code, e.g., individual code for each module, for causing at least one computer, e.g., processor 802, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 9 control and/or configure the communications device 800 or elements therein such as the processor 802, to perform the functions of the corresponding steps illustrated in the method flow chart 700 of FIG. 7.

The assembly of modules 900 includes a module corresponding to each step of the method shown in FIG. 7. The module in FIG. 9 which performs or controls the processor 802 to perform a corresponding step shown in FIG. 7 is identified with a number beginning with a 9 instead of beginning with 7. For example module 904 corresponds to step 704 and is responsible for performing the operation described with regard to step 704. As illustrated in FIG. 9, the assembly of modules 900 includes a module 902 for receiving network topology information, a module 703 for storing the network topology information, a module 904 for receiving interference information from base stations and/or wireless terminals, a module 908 for storing received interference information, and a module 910 for receiving a message indicating an intent to establish communications between devices, e.g., between a first wireless terminal and a second wireless terminal. The module 904 includes a module 905 for receiving interference information from a second base station, said interference information including at least one of: i) interference information determined by the second base station from a signal received by the second base station from the first wireless terminal and ii) interference information determined by a third wireless terminal in a second base station coverage area which was reported to the second base station. In some embodiments module 904 further includes an optional module 906 for receiving interference information from a base station which is outside the coverage area where the second wireless terminal is located, the interference information including at least one of: i) interference information determined by said base station from a signal received by the base station from the second wireless terminal and ii) interference information determined by another wireless terminal in the coverage area of said base station, which was reported to said base station.

In some embodiments the assembly of modules 900 further includes a module 922 for determining a first direct mode of system interference cost estimate based on expected interference, if the first and second wireless terminals communicate using a direct mode of operation, to both a first base station coverage area and the second base station coverage area, a module 924 for determining a first infrastructure mode of system interference cost estimate based on expected interference, if the first and second wireless terminals communicate using an infrastructure mode of operation, to both the first base station coverage area and the second base station coverage area, and a module 926 for determining a first mode of operation for communication from the first wireless terminal, located in the first base station coverage area, to the second wireless terminal as a function of interference which will be caused in the second base station coverage area adjacent the first base station coverage area, the first mode of operation being one of the direct mode of operation and the infrastructure mode of operation. In some embodiments the determination module 926 further includes a module 927 for selecting, as the first mode, a mode of operation having lower determined system interference cost estimate.

In some embodiments the assembly of modules 700 further includes an optional module 928 for determining a second direct mode system interference cost estimate, e.g., based on expected interference caused to both the first base station coverage area and the coverage area of said base station, e.g., where the second wireless terminal is located, if the second wireless terminal and the first wireless terminal communicate using direct mode, an optional module 930 for determining a second infrastructure mode system interference cost estimate, e.g., based on expected interference caused to both the first base station coverage area and the coverage area of said base station, if the second wireless terminal and the first wireless terminal communicate using the infrastructure mode, an optional module 932 for determining a second mode of operation for communication from the second wireless terminal to the first wireless terminal as a function of interference which will be caused in a base station coverage area other than a base station coverage area in which the second wireless terminal is located, said second mode of operation being one of the second direct mode of operation or the second infrastructure mode of operation. In some embodiments the module 932 includes a module 934 for selecting the mode of operation having the lower determined system interference cost estimate.

The assembly of modules 900 further includes a module 936 for communicating to the first wireless terminal the determined first mode of operation to be used for communication from the first wireless terminal to the second wireless terminal, and for optionally communicating the determined second mode of operation for communication from the second wireless terminal. The module 936 in some embodiments include a module 938 for transmitting the determined first mode of operation to the first wireless terminal via the first base station included in the first base station coverage area. Assembly of modules 900 further includes a module 940 for transmitting to the second wireless terminal, information indicating the determined first mode of operation, and optionally communicating the determined second mode of operation for communication from the second wireless terminal to the first wireless terminal.

The modules shown in dashed lines boxes are optional, and thus one or more of these modules may be present in some embodiments while not in others. The dashed boxes indicate that although these modules are included in the assembly of modules 900 in various embodiments, the processor 802 may execute such an optional module in embodiments where the step to which these modules correspond, is performed. In some embodiments, one or more modules shown in FIG. 9 which are included within another module may be implemented as an independent module or modules. For example, module 927, in some embodiments, may be implemented as a standalone module with regard to module 926.

For the above discussion it should be appreciated that numerous variations and embodiments are possible.

The techniques of various embodiments may be implemented using software, hardware and/or a combination of software and hardware. Various embodiments are directed to apparatus, e.g., control node, mobile nodes such as mobile terminals, base stations, communications system. Various embodiments are also directed to methods, e.g., method of controlling and/or operating a control node, mobile nodes, base stations and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as a control node, access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a control device, the method comprising:
   determining a first mode of operation for communication from a first wireless terminal, located in a first base station coverage area, to a second wireless terminal as a function of a direct mode system interference cost estimate and an infrastructure mode system interference cost estimate, said direct mode system interference cost estimate being based on interference which will be caused in a second base station coverage area if said first wireless terminal uses a direct mode of operation to communicate with said second wireless terminal, said infrastructure mode system interference cost estimate being based on interference which will be caused in the second base station coverage area if said first wireless terminal uses an infrastructure mode of operation to communicate with said second wireless terminal, said second base station coverage area corresponding to a second base station located adjacent a first base station to which said first base station coverage area corresponds, said first mode of operation being one of said direct mode of operation and said infrastructure mode of operation; and
   communicating to the first wireless terminal the determined first mode of operation to be used for communication from the first wireless terminal to the second wireless terminal.

2. The method of claim 1, further comprising:
   determining a second mode of operation for communication from the second wireless terminal to the first wireless terminal as a function of interference which will be caused in a base station coverage area other than a base station coverage area in which said second wireless terminal is located, said second mode of operation being one of said direct mode of operation and said infrastructure mode of operation; and
   communicating to the second wireless terminal the determined second mode of operation to be used for communication from the second wireless terminal to the first wireless terminal.

3. The method of claim 1, further comprising:
   receiving interference information from a second base station, said interference information including at least one of: i) interference information determined by said second base station from a signal received by said second base station from the first wireless terminal located in the first base station coverage area; or ii) interference information determined by a third wireless terminal in the second base station coverage area which was reported to said second base station, said second base station coverage area being located adjacent said first base station coverage area; and determining at least one of said direct mode system interference cost estimate and said infrastructure mode system interference cost estimate based on said interference information received from the second base station.

4. The method of claim 3, wherein determining at least one of said direct system interference cost estimate and said infrastructure mode system interference cost estimate includes:

determining said direct mode system interference cost estimate based on expected interference to said first base station coverage area and to said second base station coverage area, if said first and second wireless terminals communicate using said direct mode, by combining a first interference cost estimate corresponding to said first base station coverage area with a second interference cost estimate corresponding to said second base station coverage area, said second interference cost estimate corresponding to the second interference coverage area being based on said interference which will be caused in the second base station coverage area if said first wireless terminal uses a direct mode of operation to communicate with said second wireless terminal.

5. The method of claim 2, wherein said control device is a network node coupled to at least one of said first or second base stations, said control device being a node other than said first and second wireless terminals; and wherein communicating to the first wireless terminal the determined first mode of operation includes transmitting the determined first mode of operation to the first wireless terminal via a first base station included in the first base station coverage area.

6. The method of claim 1, wherein determining said first mode of operation is also a function of interference which will be caused in a base station coverage area other than a base station coverage area in which said second wireless terminal is located, if the determined first mode is used for communication from said second wireless terminal to the first wireless terminal.

7. A communications device comprising:

at least one processor configured to:

determine a first mode of operation for communication from a first wireless terminal, located in a first base station coverage area, to a second wireless terminal as a function of a direct mode system interference cost estimate and an infrastructure mode system interference cost estimate, said direct mode system interference cost estimate being based on interference which will be caused in a second base station coverage area if said first wireless terminal uses a direct mode of operation to communicate with said second wireless terminal, said infrastructure mode system interference cost estimate being based on interference which will be caused in the second base station coverage area if said first wireless terminal uses an infrastructure mode of operation to communicate with said second wireless terminal, said second base station coverage area corresponding to a second base station located adjacent a first base station to which said first base station coverage area corresponds, said first mode of operation being one of said direct mode of operation and said infrastructure mode of operation; and communicate to the first wireless terminal the determined first mode of operation to be used for communication from the first wireless terminal to the second wireless terminal; and a memory coupled to the at least one processor.

8. The communications device of claim 7, wherein the at least one processor is further configured to:

receive interference information from a second base station, said interference information including at least one of: i) interference information determined by said second base station from a signal received by said second base station from the first wireless terminal or ii) interference information determined by a third wireless terminal in the second base station coverage area which was reported to said second base station, said second base station coverage area being located adjacent said first base station coverage area; and determine at least one of said direct mode system interference cost estimate and said infrastructure mode system interference cost estimate based on said interference information received from the second base station.

9. The communications device of claim 7, wherein the at least one processor is further configured to:

determine a second mode of operation for communication from the second wireless terminal to the first wireless terminal as a function of interference which will be caused in a base station coverage area other than a base station coverage area in which said second wireless terminal is located, said second mode of operation being one of said direct mode of operation and said infrastructure mode of operation; and communicate to the second wireless terminal the determined second mode of operation to be used for communication from the second wireless terminal to the first wireless terminal.

10. The communications device of claim 8, wherein said at least one processor is further configured to determine, as part of determining at least one of said direct system interference cost estimate and said infrastructure mode system interference cost estimate, said direct mode system interference cost estimate based on expected interference to said first base station coverage area and to said second base station coverage area, if said first and second wireless terminals communicate using said direct mode, by combining a first interference cost estimate corresponding to said first base station coverage area with a second interference cost estimate corresponding to said second base station coverage area, said second interference cost estimate corresponding to the second interference coverage area being based on said interference which will be caused in the second base station coverage area if said first wireless terminal uses a direct mode of operation to communicate with said second wireless terminal.

11. The communications device of claim 9, wherein in communicating to the first wireless terminal the determined first mode of operation, the at least one processor is further configured to transmit, the determined first mode of operation to the first wireless terminal via a first base station included in the first base station coverage area.

12. The communications device of claim 7, wherein determining said first mode of operation is also a function of interference which will be caused in a base station coverage area other than a base station coverage area in which said second wireless terminal is located, if the determined first mode is used for communication from said second wireless terminal to the first wireless terminal.

13. A communications device comprising:
    means for determining a first mode of operation for communication from a first wireless terminal, located in a first base station coverage area, to a second wireless terminal as a function of a direct mode system interference cost estimate and an infrastructure mode system interference cost estimate, said direct mode system interference cost estimate being based on interference which will be caused in a second base station coverage area if said first wireless terminal uses a direct mode of operation to communicate with said second wireless terminal, said infrastructure mode system interference cost estimate being based on interference which will be caused in the second base station coverage area if said first wireless terminal uses an infrastructure mode of operation to communicate with said second wireless terminal, said second base station coverage area corresponding to a second base station located adjacent a first base station to which said first base station coverage area corresponds, said first mode of operation being one of said direct mode of operation and said infrastructure mode of operation; and
    means for communicating to the first wireless terminal the determined first mode of operation to be used for communication from the first wireless terminal to the second wireless terminal.

14. The communications device of claim 13, further comprising:
    means for receiving interference information from a second base station, said interference information including at least one of: i) interference information determined by said second base station from a signal received by said second base station from the first wireless terminal or ii) interference information determined by a third wireless terminal in the second base station coverage area which was reported to said second base station, said second base station coverage area being located adjacent said first base station coverage area.

15. The communications device of claim 13, further comprising:
    means for determining a second mode of operation for communication from the second wireless terminal to the first wireless terminal as a function of interference which will be caused in a base station coverage area other than a base station coverage area in which said second wireless terminal is located, said second mode of operation being one of said direct mode of operation and said infrastructure mode of operation; and
    means for communicating to the second wireless terminal the determined second mode of operation to be used for communication from the second wireless terminal to the first wireless terminal.

16. The communications device of claim 13, further comprising:
    means for determining said direct mode system interference cost estimate based on expected interference to said first base station coverage area and to said second base station coverage area, if said first and second wireless terminals communicate using said direct mode, said direct mode system interference cost estimate being determined by combining a first interference cost estimate corresponding to said first base station coverage area with a second interference cost estimate corresponding to said second base station coverage area, said second interference cost estimate corresponding to the second interference coverage area being based on said interference which will be caused in the second base station coverage area if said first wireless terminal uses a direct mode of operation to communicate with said second wireless terminal.

17. The communications device of claim 15,
    wherein said means for communicating to the first wireless terminal the determined first mode of operation, include means for transmitting the determined first mode of operation to the first wireless terminal via a first base station included in the first base station coverage area.

18. The communications device of claim 13, wherein said means for determining said first mode of operation include means for determining the first mode as a function of interference which will be caused in a base station coverage area other than a base station coverage area in which said second wireless terminal is located, if the determined first mode is used for communication from said second wireless terminal to the first wireless terminal.

19. A computer program product for use in a communications device, comprising:
    a non-transitory computer readable medium comprising:
        code for causing at least one computer to determine a first mode of operation for communication from a first wireless terminal, located in a first base station coverage area, to a second wireless terminal as a function of a direct mode system interference cost estimate and an infrastructure mode system interference cost estimate, said direct mode system interference cost estimate being based on interference which will be caused in a second base station coverage area if said first wireless terminal uses a direct mode of operation to communicate with said second wireless terminal, said infrastructure mode system interference cost estimate being based on interference which will be caused in the second base station coverage area if said first wireless terminal uses an infrastructure mode of operation to communicate with said second wireless terminal, said second base station coverage area corresponding to a second base station located adjacent a first base station to which said first base station coverage area corresponds, said first mode of operation being one of said direct mode of operation and said infrastructure mode of operation; and
        code for causing the at least one computer to communicate to the first wireless terminal the determined first mode of operation to be used for communication from the first wireless terminal to the second wireless terminal.

20. The computer program product of claim 19, wherein the non-transitory computer readable medium further comprises:
    code for causing the at least one computer to receive interference information from a second base station, said interference information including at least one of: i) interference information determined by said second base station from a signal received by said second base station from the first wireless terminal or ii) interference information determined by a third wireless terminal in the second base station coverage area which was reported to said second base station, said second base station coverage area being located adjacent said first base station coverage area; and
    code for causing the at least one computer to determine at least one of said direct mode system interference cost estimate and said infrastructure mode system interference cost estimate based on said interference information received from the second base station.

* * * * *